(12) United States Patent
Vondráček

(10) Patent No.: US 11,707,957 B2
(45) Date of Patent: Jul. 25, 2023

(54) FRAME, IN PARTICULAR OF A UNIVERSAL CARRIER

(71) Applicant: DVOŘÁK—svahové sekačky, s. r.o., Pohled (CZ)

(72) Inventor: Pavel Vondráček, Havlíčkův Brod (CZ)

(73) Assignee: DVORÁK—SVAHOVÉ SEKACKY, S. R.O, Pohled (CZ)

(*) Notice: Subject to any disclaimer, the term of this patent is extended or adjusted under 35 U.S.C. 154(b) by 60 days.

(21) Appl. No.: 17/598,769

(22) PCT Filed: Mar. 3, 2020

(86) PCT No.: PCT/CZ2020/000007
§ 371 (c)(1),
(2) Date: Sep. 27, 2021

(87) PCT Pub. No.: WO2020/192805
PCT Pub. Date: Oct. 1, 2020

(65) Prior Publication Data
US 2022/0185049 A1 Jun. 16, 2022

(30) Foreign Application Priority Data
Mar. 27, 2019 (CZ) ............... CZ2019-184

(51) Int. Cl.
*B60G 5/02* (2006.01)

(52) U.S. Cl.
CPC ........ *B60G 5/025* (2013.01); *B60G 2200/322* (2013.01); *B60G 2300/07* (2013.01)

(58) Field of Classification Search
CPC ............... B60G 9/02; B60G 2200/32; B60G 2200/322; B60G 5/02; B60G 5/025
See application file for complete search history.

(56) References Cited

U.S. PATENT DOCUMENTS

| 1,194,738 | A | * | 8/1916 | Holt | ............... B60G 9/02 180/9 |
| 1,258,445 | A | * | 3/1918 | Pedelty | ............... B60G 9/02 280/124.113 |

(Continued)

FOREIGN PATENT DOCUMENTS

| DE | 2548238 A1 | 5/1976 |
| EP | 0501585 A1 | 9/1992 |

(Continued)

OTHER PUBLICATIONS

ISR for International Application PCT/CZ2020/000007 dated Jun. 8, 2020.

(Continued)

*Primary Examiner* — Paul N Dickson
*Assistant Examiner* — Maxwell L Meshaka
(74) *Attorney, Agent, or Firm* — Ladas & Parry LLP

(57) ABSTRACT

A frame, in particular of a universal carrier, which includes a chassis of the frame, a left axle with two portal suspensions at the ends of the left axle, a right axle with two portal suspensions at the ends of the right axle, and the double-sided stabilizing lever. The double-sided stabilizing lever is pivotally mounted on the chassis of the frame in the transverse direction. The axles are pivotally mounted on the chassis of the frame in the longitudinal direction. The double-sided stabilizing lever is connected to the left axle and the right axle and is arranged between them transversely.

11 Claims, 3 Drawing Sheets

(56) References Cited

U.S. PATENT DOCUMENTS

| | | | | |
|---|---|---|---|---|
| 2,232,549 | A | * | 2/1941 | McNamara .............. B60G 9/02 |
| | | | | 280/124.111 |
| 3,917,306 | A | | 11/1975 | Madler et al. |
| 6,585,286 | B2 | * | 7/2003 | Adema .................... B60G 5/02 |
| | | | | 280/681 |
| 11,279,189 | B1 | * | 3/2022 | Sandbrook ............. B60G 5/025 |

FOREIGN PATENT DOCUMENTS

| | | |
|---|---|---|
| EP | 0737464 A2 | 10/1996 |
| WO | 2011/057314 A1 | 5/2011 |

OTHER PUBLICATIONS

Written Opinion for International Application PCT/CZ2020/000007 dated Jun. 8, 2020.
DE 2548238 A1 dated May 6, 1976 _ English Translation.
WO 2011/057314 A1 dated May 19, 2011 _ English Translation.

* cited by examiner

FRAME, IN PARTICULAR OF A UNIVERSAL CARRIER

This application is a national phase entry under 35 USC 371 of International Patent Application No PCT/CZ2020/000007 filed on 3 Mar. 2020, which claims the benefit of CZ Application No. PV 2019-184 filed on 27 Mar. 2019, the entire content of which is incorporated herein by reference.

TECHNICAL FIELD

The invention relates to a frame, in particular of a universal carrier.

BACKGROUND ART

Several types of frames with axles are known from practice.

There are known frames having a rigid axle (leaf spring axle, axle with an integrated gearbox and Panhard rod, De Dion axle), further the frames with a rigid half axle (a coupled axle) as well as the axles with an independent axle (a trapezoidal axle, McPherson axle, a multilink suspension) etc.

The disadvantages of the above-mentioned frames with axles are, in particular, the large number of unsprung masses and the fact that a large installation space is required.

A further disadvantage lies in the mounting of axles with expensive and faulty components in the transverse and longitudinal direction.

None of the existing manufacturers offer a simple solution for transferring a movement from one side of the axle to the other.

It is an object of the present invention to overcome the above-mentioned disadvantages of the prior art and to provide the frame of a universal carrier with axle mountings that will provide a swinging movement of each axle without transmitting the swinging to the chassis of the frame.

SUMMARY OF THE INVENTION

According to the invention, the above object is achieved by providing a frame, in particular of a universal carrier, which comprises
a chassis of the frame,
left axle with two portal suspensions at the ends of the left axle,
right axle with two portal suspensions at the ends of the right axle, and
a double-sided stabilizing lever.

The double-sided stabilizing lever is pivotally mounted on the chassis of the frame in the transverse direction.

The axles are pivotally mounted on the chassis of the frame in the longitudinal direction.

The double-sided stabilizing lever is connected to the left axle and to the right axle and is arranged transversely between them in the transversal direction.

The double-sided stabilizing lever is preferably connected to the chassis of the frame by means of a first pivot, wherein the double-sided stabilizing lever is pivotally arranged about the axis of the first pivot.

The double-sided stabilizing lever is preferably connected to the left axle by means of a resilient mounting, wherein the double-sided stabilizing lever is connected to the right axle by means of a resilient mounting.

The left axle is preferably pivotally mounted on the chassis of the frame by means of a second center pivot.

The right axle is preferably pivotally mounted on the chassis of the frame by means of a third central pivot.

The axis of the portal suspension of the left axle front wheel and the axis of the portal suspension of the left axle rear wheel are preferably spaced from each other in the longitudinal direction by a distance that is equal to the distance that the axis of the portal suspension of the right axle front wheel and the axis of the portal suspension of the right axle rear wheel are located from each other in the longitudinal direction.

The axis of the portal suspension of the left axle rear wheel is preferably spaced in the longitudinal direction from the center of the first pivot of the double-sided stabilizing lever by a length equal to the length by which the axis of the rear axle of the right-hand axle is spaced in the longitudinal direction from the center of the first pivot of the double-sided stabilizing lever.

The center of the resilient mounting of the left axle is preferably spaced in the transverse direction from the center of the resilient mounting of the right axle by a certain length, wherein the center of the resilient mounting of the left axle is spaced in the transversal direction from the center of the first pivot of the double-sided stabilizing lever by the half length.

When the front wheel of the left axle is lifted by a specific height from the horizontal plane, the center of the first pivot of the double-sided stabilizing lever lies at a distance xB from the horizontal plane, and the following equations applies:

$$xB = \frac{h \times b}{L_t}$$

where
xB is the distance of the center of the first pivot from the horizontal plane of the axles;
h is the lift height of the front wheel of the left axle;
b is the distance of the wheel portal suspension axes of the left and right axles, respectively, from the center of the first pivot; and
$L_t$ is the distance of the front wheel portal suspension axis from the rear wheel portal suspension axis at the left and right axles, respectively.

When the front wheel of the left axle is lifted by a specific height from the horizontal plane, the double-sided stabilizing lever forms an angle β with the horizontal axle plane, and the following equations applies:

$$\sin\beta = \frac{xB}{d/2}$$

where
xB is the distance of the center of the first pivot from the horizontal plane of the axles; and
d/2 is the distance of the center of the resilient axle mounting from the center of the first pivot.

According to the present invention, the frame, in particular of a universal carrier, has been developed with the longitudinal mounting of axles in the chassis of the frame with the transverse coupling of the axles by means of the stabilizing rod in the form of a double-sided stabilizing lever.

The inventive frame, in particular of the universal carrier, comprises the chassis of the frame, on which axles are mounted by means of center axle pivots with the possibility of a swinging movement.

At each end of the axle, portal wheel suspensions are mounted that can be rotated 360° around their vertical axes of the wheel suspensions.

The stabilizing rod in the form of the double-sided stabilizing lever is supported by the pivot in the longitudinal direction to the chassis of the frame and ensures the connection of both axles via a resilient mounting.

The solution according to the invention is characterized in particular by the following features:

The almost vertical axes of the portal suspensions of the left axle wheels in the longitudinal direction are spaced apart at a distance $L_{tL}$.

The almost vertical axes of the portal suspensions of the right axle wheels in the longitudinal direction are spaced apart at a distance $L_{tP}$.

The almost vertical axis of the portal suspension of the left axle rear wheel is spaced from the center of the pivot in the longitudinal direction at a length $b_L$.

The almost vertical axis of the portal wheel suspension of the right axle rear wheel is spaced from the center of the pivot in the longitudinal direction at a length $b_L$.

The center of the resilient mounting of the left axle and the center of the resilient mounting of the right axle in the transverse direction are spaced from each other at a distance d.

The center of the resilient mounting of the left axle and the center of the stabilizing rod pivot in the transverse direction are located at a distance d/2.

When driving the frame, one portal wheel suspension (for example, the front wheel portal suspension of the left axle) raises by a height h, shifting the center of the stabilizing rod pivot by the distance xB, for which the following equation applies:

$$xB = \frac{h \times b}{L_t}$$

The stabilizing rod transmits this movement to the right longitudinally mounted axle, immediately tilting the stabilizing rod by an angle β for which the following equation applies:

$$\sin\beta = \frac{xB}{d/2}$$

BRIEF DESCRIPTION OF THE DRAWINGS

The invention will be further explained on the basis of a non-limiting example of a practical embodiment thereof, the description of which will be given with reference to the accompanying drawings, in which.

DETAILED DESCRIPTION OF THE INVENTION

Figure 1:
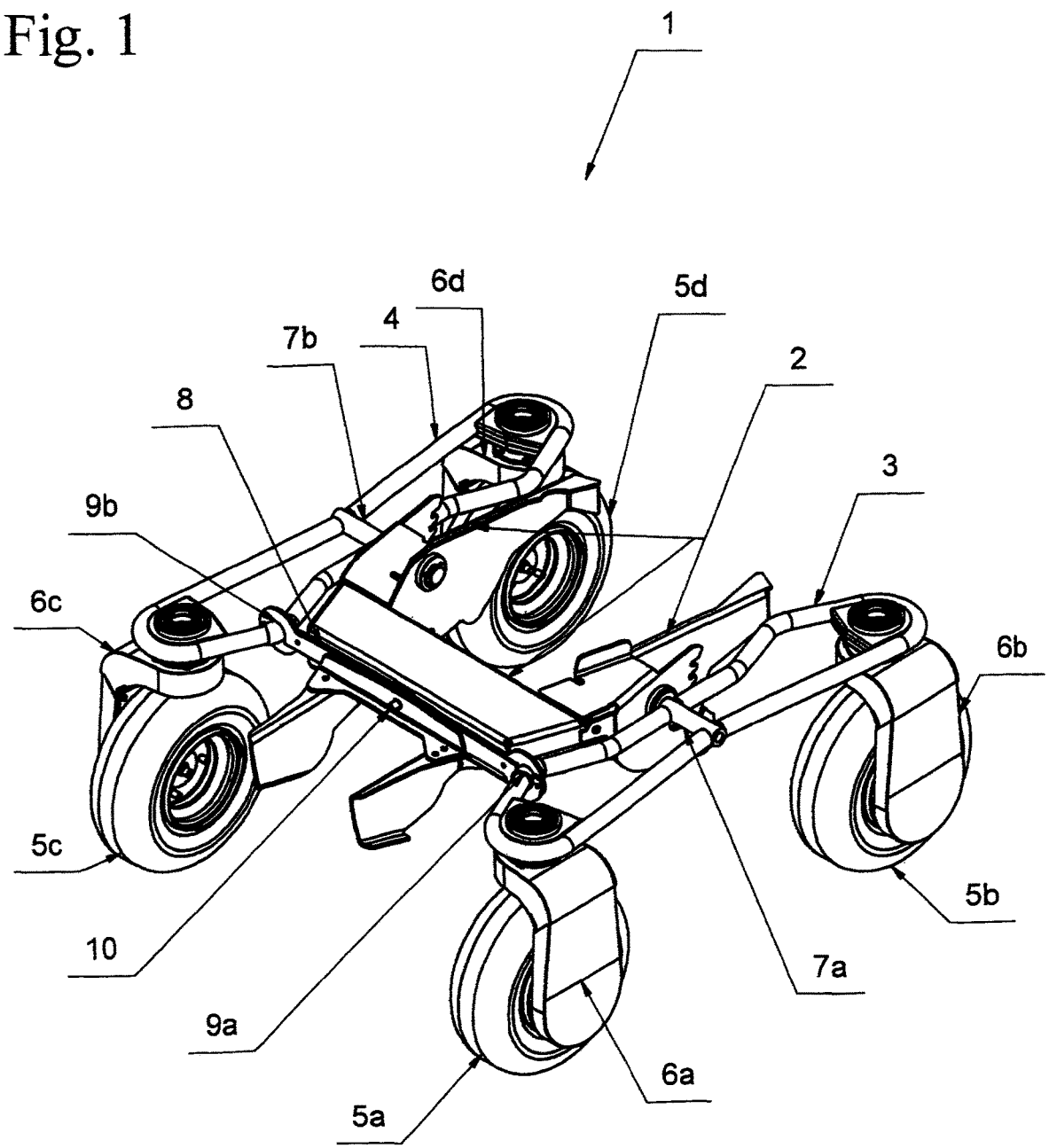
FIG. 1 shows an isometric view of the frame according to an exemplary embodiment of the present invention.

According to the invention, the frame 1, in particular of a universal carrier, has been developed, having longitudinal mountings of axles 3 and 4 on the chassis 2 of the frame 1, wherein the connection of the left axle 3 and right axle 4 is secured by a lateral stabilizing lever 8 which is mounted in the transverse direction.

A preferred exemplary embodiment of the present invention is shown in the accompanying drawings.

As shown in FIGS. 1 to 5, the frame 1, in particular of the universal carrier, comprises the chassis 2 of the frame 1, which may be, for example, a welded sheet metal structure in which the left axle 3 is supported by a center pivot 7a and the right axle 4 is supported by a center pivot 7b which may form for example a welded tubular frame with pivots.

Figure 2:
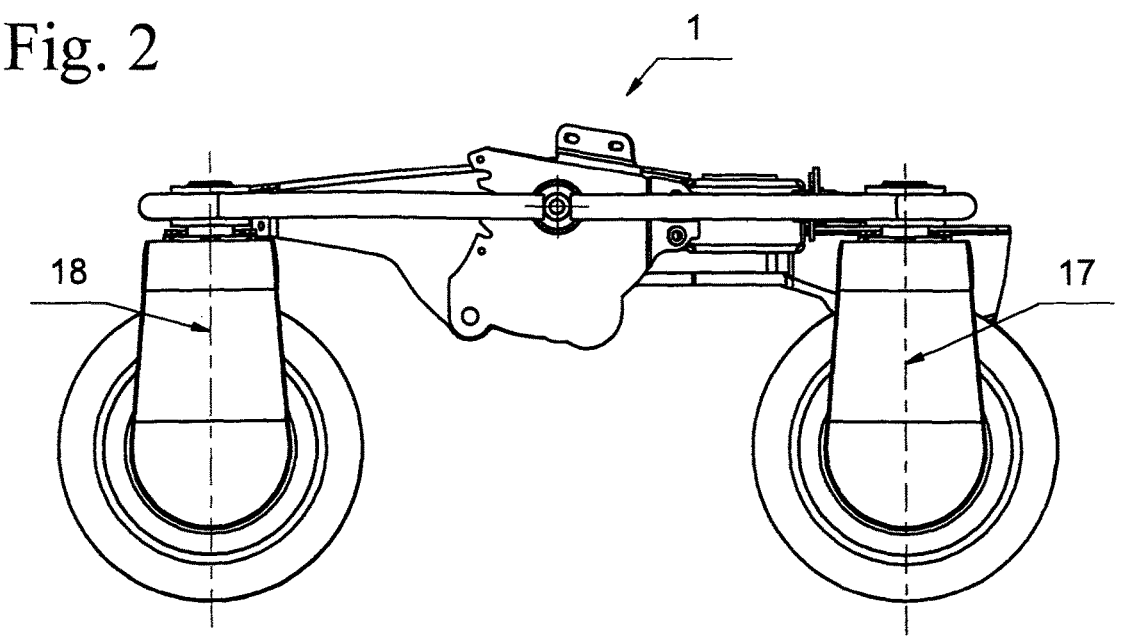
FIG. 2 shows a side view of the frame according to an exemplary embodiment of the present invention.
Figure 3:
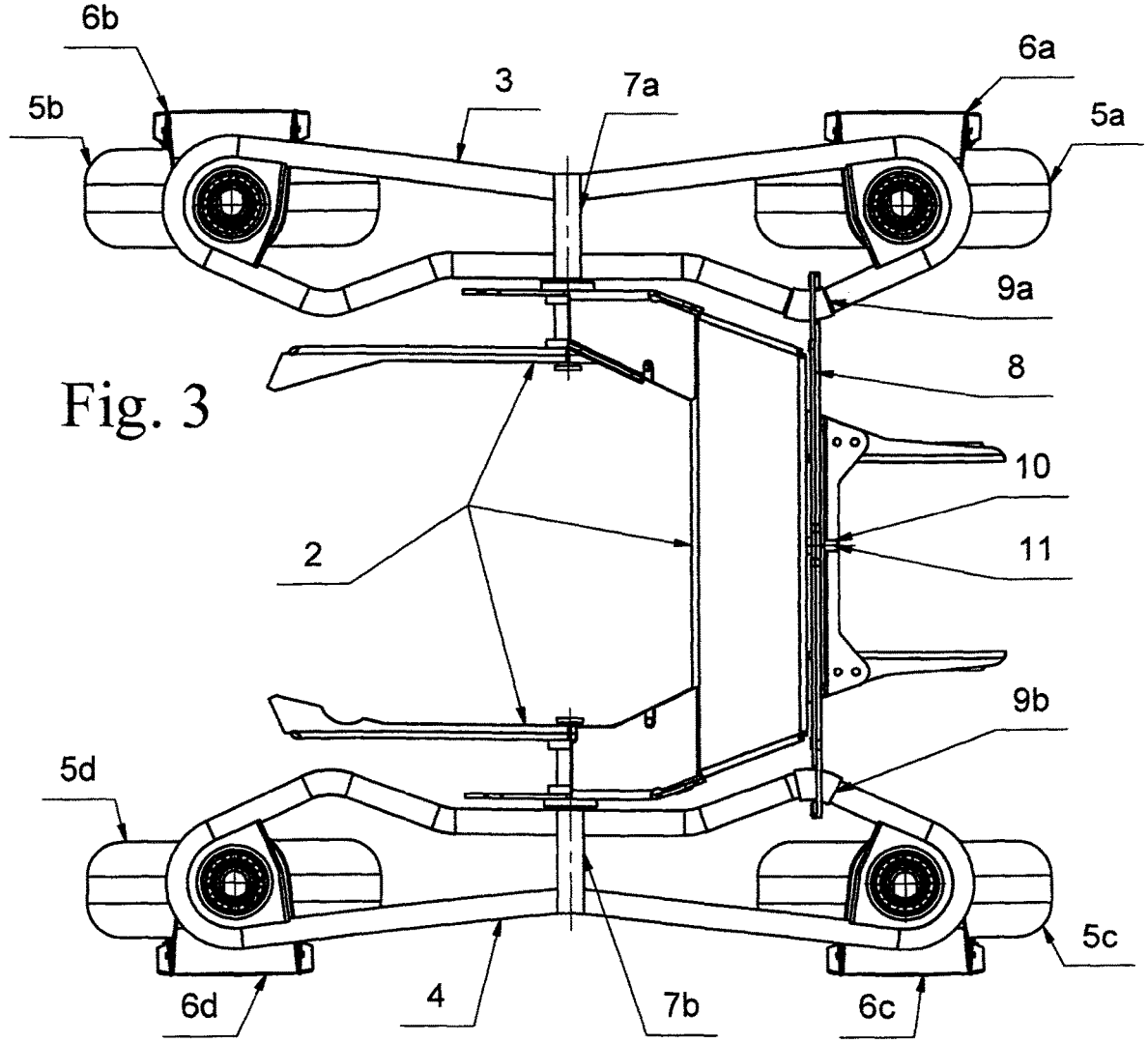
FIG. 3 shows a top view of the frame according to an exemplary embodiment of the present invention.
Figure 4:
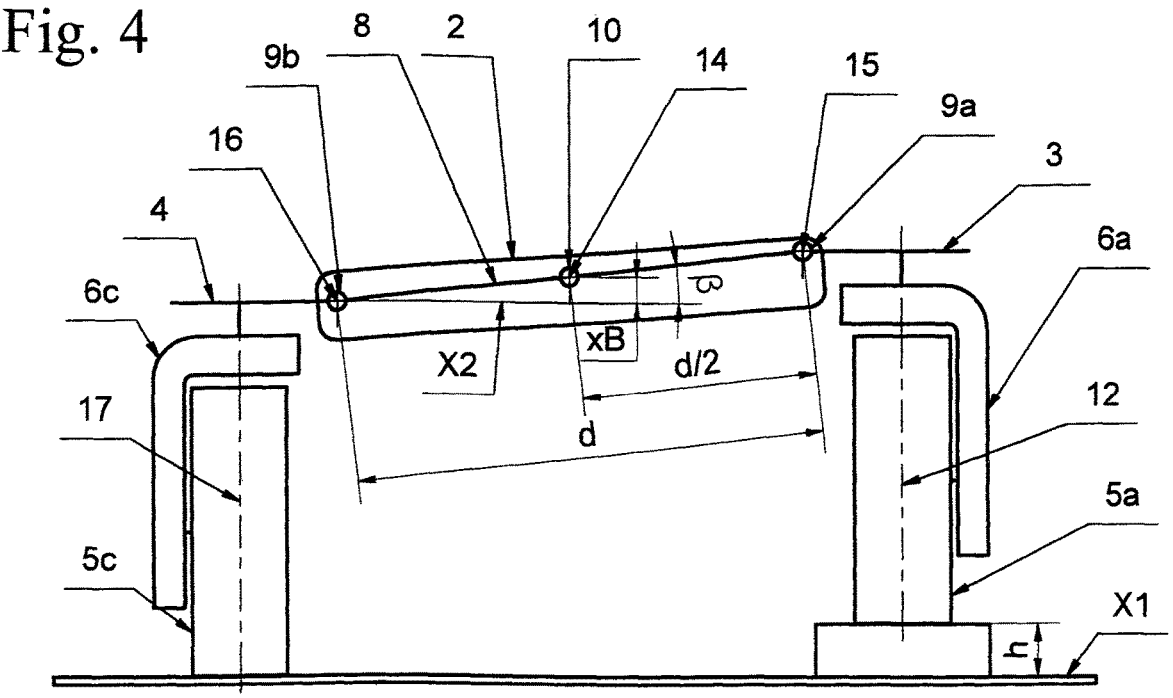
FIG. 4 shows a simplified diagram of the frame as it travels off-road from a front view in the straight direction of FIG. 1.
Figure 5:
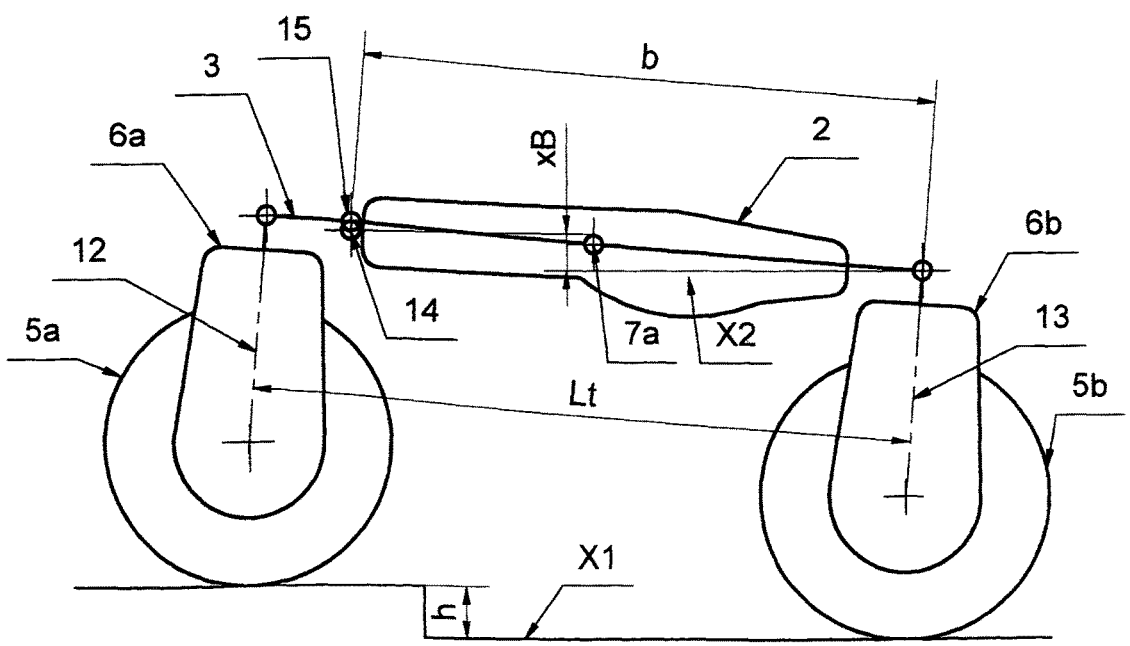
FIG. 5 shows a simplified diagram of the frame as it travels off-road from a side view in the longitudinal direction of FIG. 1.

The swivel mounting of the left axle 3 and the right axle 4 can be manufactured for example, by means of nylon bushings located on the chassis 2 of the frame 1 (see FIG. 1 and FIG. 2).

At the one end, the left axle 3 has a front wheel 5a portal suspension 6a, at the other end the left axle 3 has a rear wheel 5b portal suspension 6b, wherein the two portal suspensions 6a and 6b can have, for example, an unrestricted 360° rotation via a mounting flange.

At the one end, the right axle 4 has a front wheel 5c portal suspension 6c, at the other end the right axle 4 has a rear wheel 5d portal suspension 6d, and the two portal suspensions 6c and 6d can have, for example, an unrestricted 360° rotation.

In the transverse direction, on the chassis 2 of the frame 1 a double-sided stabilizing lever 8 is mounted, which may be formed, for example, by a pair of metal panels screwed together, to secure the motion transmission from the left axle 3 to the right axle 4 and vice versa.

The double-sided stabilizing lever 8 is connected by a pivot 10 to the chassis 2 of the frame 1. This connection allows a rotation of the double-sided stabilizing lever 8 around a nearly horizontal axis 11 of the first pivot 10, ensuring that the frame perfectly follows the terrain while driving.

The resilient mounting 9a of the left axle 3 and the double-sided stabilizing lever 8 as well as the resilient mounting 9b of the right axle 4 and the double-sided stabilizing lever 8 can be formed, for example, by a silent-block.

The solution according to the invention is characterized in particular by the following embodiment:

The double-sided stabilizing lever 8 is mounted in the transverse direction on the chassis 2 of the frame 1 by means of the first pivot 10.

The double-sided stabilizing lever 8 is connected to the left axle 3 by means of a resilient mounting 9a.

The double-sided stabilizing lever 8 is connected to the right axle 4 by means of a resilient mounting 9b.

The left axle 3 is mounted on the chassis 2 of the frame 1 by means of the second center pivot 7a.

The right axle 4 is mounted on the chassis 2 of the frame 1 by means of the third central pivot 7b.

The almost vertical axis 12 of the portal wheel suspension 6a of the left axle 3 and the almost vertical axis 13 of the portal wheel suspension 6b of the left axle 3 are spaced in the longitudinal direction from each other at a length $L_{dL}$.

The almost vertical axis 17 of the portal wheel suspension 6c of the right axle 3 and the almost vertical axis 18 of the portal wheel suspension 6d of the right axle 4 are spaced in the longitudinal direction from each other at the same length $L_{dP}$.

The almost vertical axis 13 of the portal wheel suspension 6b of the left axle 3 is spaced from the center 14 of the pivot 10 of the double-sided stabilizing lever 8 at a length $b_L$.

The almost vertical axis 18 of the portal wheel suspension 6d of the right axle 4 is spaced from the center 14 of the pivot 10 of the double-sided stabilizing lever 8 at the same length $b_P$.

The centre 15 of the resilient mounting 9a of the left axle 3 is in the transverse direction spaced from the centre 16 of the resilient mounting 9b of the right axle 4 at a length d.

The center 15 of the resilient mounting 9a of the left axle 3 is in the transverse direction spaced from the center 14 of the first pivot 10 of the double-sided stabilizing lever 8 at a length d/2.

By raising the front wheel 5a of the left axle 3 by the height h, the position of the center 14 of the first pivot 10 of the double-sided stabilizing lever 8 is changed by the distance xB for which the following equations applies:

$$xB = \frac{h \times b}{L_t}$$

where xB is the distance xB of the center 14 of the first pivot 10 from the horizontal plane X2 of the axles 3, 4;

h is the lift height h of the front wheel 5a of the left axle from the basic horizontal plane X1;

b is the distance $b_L$ of the axis 13 of the wheel portal suspension 6b of the left axle 3 wheel from the center 14 of the first pivot 10, and the distance $b_P$ of the axis 18 of the wheel portal suspension 6d of the right axle 4 wheel, respectively, from the centre 14 of the first pivot 10; and $L_t$ is the distance $L_{tL}$ of the axis 12 of the portal suspension 6a of the front wheel 5a from the axis 13 portal suspension 6b of the rear wheel 5b at the left axle 3, and the distance $L_{tP}$ of the axis 17 of the portal suspension of the front wheel 5c from the axis 18 of the portal suspension 6d of the rear wheel 5d at the right axle 4, respectively.

This movement of the left axle 3 is transmitted via the double-sided stabilizing lever 8 to the right axle 4 and the double-sided stabilizing lever 8 rotates around the first pivot 10 by an angle β for which the following equations applies:

$$\sin\beta = \frac{xB}{d/2}$$

where xB is the distance xB of the center 14 of the first pivot from the horizontal plane X2 of the axles 3 and 4; and d/2 is the distance d/2 of the center 15 of the resilient mounting 9a of the axle 3 from the center 14 of the first pivot 10.

INDUSTRIAL APPLICABILITY

According to the present invention, a frame, in particular of a universal carrier, has been developed with two axles pivotally mounted on the frame chassis, each axle being provided with two portal suspensions which allow a rotation about its vertical axis over a 360° angle, wherein the movement from one axle to another is secured by means of a pivot of a double-sided stabilizing lever.

The invention has solved a perfect copying of the terrain while driving the frame, with a minimum transmission of axle movement to the carrier chassis.

The frame, especially of the universal carrier, is characterized by a low number of unsprung masses as well as by simple and inexpensive production of the frame parts.

This design does not require expensive damping elements and numerous frame control components.

The frame can be used especially for all wheeled and tracked vehicles.

The frame, in particular of the universal carrier, according to the invention finds application, for example, in devices for trimming grass or shrubbery areas, for maintaining road edges, railway embankments, river banks or for maintenance of difficult access terrains, both on flats and on slopes.

LIST OF REFERENCE NUMERALS

1—frame
2—chassis 2 of the frame
3—left axle
4—right axle
5a—front wheel 5a of the left axle 3
5b—rear wheel 5b of the left axle 3
5c—front wheel 5c of the right axle 4
5d—rear wheel 5d of the right axle 4
6a—portal suspension 6a of the front wheel 5a of the left axle 3
6b—portal suspension 6b of the rear wheel 5b of the left axle 3
6c—portal suspension 6c of the front wheel 5c of the right axle 4
6d—portal suspension 6c of the rear wheel 5d of the right axle 4
7a—the second centre pivot 7a of the left axle 3
7b—the third centre pivot 7b of the right axle 4
8—double-sided stabilizing lever
9a—resilient mounting 9a of the left axle 3 and the two-sided stabilizing lever 8
9b—resilient mounting 9b of the right axle 4 and the double-sided stabilizing lever 8
10—the first pivot 10 of the double-sided stabilizing lever 8
11—axis 11 of the first pivot 10
11—axis 12 of the portal suspension 6a of the front wheel 5a of the left axle 3
13—axis 13 of the portal suspension 6b of the rear wheel 5b of the left axle 3
14—center 14 of the first pivot 10 of the double-sided stabilizing lever 8
15—center 15 of the resilient mounting 9a of the left axle 3 and the two-sided stabilizing lever 8
16—center 16 of the resilient mounting 9b of the right axle 4 and the double-sided stabilizing lever 8
17—axis 17 of the portal suspension 6c of the front wheel 5c of the right axle 4
18—axis 18 of the portal suspension 6d of the rear wheel 5d of the right axle 4
$L_t$—distance $L_{tL}$ of the axis 12 of the portal suspension 6a of the front wheel 5a from the axis 13 of the portal suspension 6b of the rear wheel 5b of the left axle 3, and the distance $L_{tP}$ of the axis 17 of the portal suspension 6c of the front wheel 5c from the axis 18 of the portal suspension 6d of the rear wheel 5d of the right axle 4, respectively.

b—distance $b_L$ of the axis 13 of the wheel portal suspension 6b of the left axle 3 wheel from the center 14 of the first pivot 10, and the distance $b_P$ of the axis 18 of the wheel portal suspension 6d of the right axle 4 wheel 5d, respectively, from the centre 14 of the first pivot 10;

d—distance d from the center 15 of the resilient mounting 6a of the left axle 3 from the centre 16 of the resilient mounting 9b of the right axle 4 d/2—distance d/2 of the center 15 of the resilient mounting 9a of the axle 3 from the center 14 of the first pivot 10

X1—basic horizontal plane

X2—horizontal plane of the axles 3, 4 xB—distance xB of the center 14 of the first pivot 10 from the horizontal plane X2 of the axles 3, 4 when changing the lift height h of the front wheel 5a of the left axle 3

β—angle β between the double-sided stabilizing lever 8 and the horizontal plane X2 of the axles 3, 4 when changing the lift height h of the front wheel 5a of the left axle 3

The invention claimed is:

1. A frame which, in particular of a universal carrier, which frame (1) comprises
a chassis (2) of the frame (1),
a left axle (3) with first and second portal suspensions (6a, 6b) at respective first and second ends of the left axle (3),
a right axle (4) with first and second portal suspensions (6c, 6d) at respective first and second ends of the right axle (4), and
a double-sided stabilizing lever (8)
wherein the double-sided stabilizing lever (8) is pivotally mounted on the chassis (2) of the frame (1) in a transverse direction at a central mounting portion of the double-sided stabilizing lever,
the respective left and right axles (3, 4) are pivotally mounted on the chassis (2) of the frame (1) in a longitudinal direction, and
the double-sided stabilizing lever (8) is an elongate structure comprising opposed first and second ends, the first end being directly connected to the left axle (3) at a first end mounting portion of the double-sided stabilizing lever and the second end being directly connected to the right axle (4) at a second end mounting portion of the double-stabilizing lever, the double-sided stabilizing lever being arranged transversely between the left and right axles, wherein the first end mounting portion, the second end mounting portion and the central mounting portion are substantially collinearly disposed along the double-sided stabilizing lever.

2. The frame according to claim 1, characterized in that the double-sided stabilizing lever (8) is connected to the chassis (2) of the frame (1) via a first pivot (10), the double-sided stabilizing lever (8) being arranged pivotally about the axis (11) of the first pivot (10).

3. The frame according to claim 2, characterized in that the double-sided stabilizing lever (8) is connected to the left axle (3) by means of a first resilient mounting (9a), wherein the double-sided stabilizing lever (8) is connected to the right axle (4) by means of a second resilient mounting (9b).

4. The frame according to claim 3, characterized in that an axis (12) of a first portal suspension (6a) of the left axle (3) and an axis (13) of a second portal suspension (6b) of the left axle (3) are spaced in the longitudinal direction apart at a distance ($L_{tL}$) which is equal to the distance ($L_{tP}$) by which an axis (17) of a first portal suspension (6c) of the right axle (4) and an axis (18) of a second portal suspension (6d) of the right axle (4) are spaced apart in the longitudinal direction.

5. The frame according to claim 4, characterized in that the axle (13) of the portal suspension (6b) of a rear wheel (5b) of the left axle (3) is in the longitudinal direction spaced from the center (14) of the first pivot (10) of the double-sided stabilizing lever (8) by a length ($b_L$) which is the same as the length ($b_P$) by which the axis (18) of the portal suspension (6d) of the rear wheel (5d) of the right axle (4) is spaced longitudinally from the center (14) of the first pivot (10) of the double-sided stabilizing lever (8).

6. The frame according to claim 5, characterized in that the center (15) of the resilient mounting (9a) of the left axle (3) is laterally spaced from the center (16) of the resilient mounting (9b) of the right axle (4) by a length (d), wherein the center (15) of the resilient mounting (9a) of the left axle (3) is transversely spaced from the center (14) of the first pivot (10) of the double-sided stabilizing lever (8) by a half length (d/2).

7. The frame according to claim 6, characterized in that by raising a front wheel (5a) of the left axle (3) by the height (h) from a basic horizontal plane (XI), the center (14) of the first pivot (10) of the double-sided stabilizing lever (8) lies at a distance (xB) from a horizontal plane (X2) of the respective left and right axles (3, 4), wherein the following equation applies:

$$xB = \frac{h \times b}{L_t}$$

where
xB is the distance (xB) of the center (14) of the first pivot (10) from the horizontal plane (X2) of the left and right axles (3, 4);
h is the lift height (h) of the front wheel (5a) from the basic horizontal plane (XI);
b is the distance ($b_L$, $b_P$) of the axes (13, 18) of the wheel portal suspensions (6a, 6c) of the left and right axles (3, 4) wheels from the center (14) of the first pivot (10); and
L is the distance ($L_{tL}$, $L_{tP}$) of the axes (12, 17) of the portal suspensions (6a, 6c) of the front wheel (5a, 5c) from the axes (13, 18) of the portal suspension (6b, 6d) of the rear wheel (5b, 5d) at the left and right axle (3, 4).

8. The frame according to claim 7, characterized in that by raising the front wheel (5a) of the left axle (3) by the height (h) from the basic horizontal plane (XI), the double-sided stabilizing lever (8) forms an angle (b) with the horizontal plane (X2) of the left and right axles (3, 4), for which the following equation applies:

$$\sin\beta = \frac{xB}{d/2}$$

where
xB is the distance (xB) of the center (14) of the first pivot (10) from the horizontal plane (X2) of the axles (3, 4); and
d/2 is the distance (d/2) of the center (15) of the resilient mounting (9a) of the axle (3) from the center (14) of the first pivot (10).

9. The frame according to claim 1, characterized in that the left axle (3) is pivotally mounted on the chassis (2) of the frame (1) by means of a second center pivot (7a).

10. The frame according to claim 1, characterized in that the right axle (4) is pivotally mounted on the chassis (2) of the frame (1) by means of a third center pivot (7*b*).

11. The frame according to claim 1, wherein each of the left and right axles has opposed front and rear wheels, and wherein, with the frame disposed on a level surface with the front and rear wheels of the left and right axles contacting the surface, the double-sided stabilizing lever and the left and right axles are disposed in substantially the same plane.

\* \* \* \* \*